(12) United States Patent
Schrader et al.

(10) Patent No.: US 7,473,878 B2
(45) Date of Patent: Jan. 6, 2009

(54) HIGH POWER BIMORPH WAVE-FRONT CORRECTION MIRROR

(75) Inventors: Karl N. Schrader, Albuquerque, NM (US); Steven F. Griffin, Albuquerque, NM (US); David J. Bossert, Albuquerque, NM (US); Garry R. Marions, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/760,562

(22) Filed: Jun. 8, 2007

(65) Prior Publication Data

US 2008/0302948 A1    Dec. 11, 2008

(51) Int. Cl.
*G01J 1/20* (2006.01)
*G02B 5/08* (2006.01)

(52) U.S. Cl. .............. 250/201.9; 359/295; 359/847

(58) Field of Classification Search ............. 250/201.9; 359/295, 847
See application file for complete search history.

(56) References Cited

U.S. PATENT DOCUMENTS

| | | | | |
|---|---|---|---|---|
| 3,731,103 | A * | 5/1973 | O'Meara ............... | 250/203.2 |
| 4,438,330 | A * | 3/1984 | Hardy ................... | 250/201.9 |
| 5,016,997 | A | 5/1991 | Bliss et al. | |
| 5,026,977 | A * | 6/1991 | Hubbard, Jr. ........... | 250/201.9 |
| 6,398,372 | B1 | 6/2002 | Okada | |
| 6,452,145 | B1 * | 9/2002 | Graves et al. ........... | 250/201.9 |
| 6,728,024 | B2 * | 4/2004 | Ribak ..................... | 359/299 |
| 6,874,897 | B2 * | 4/2005 | Graves et al. ........... | 359/846 |
| 7,229,178 | B1 | 6/2007 | Headley et al. | |
| 7,264,363 | B2 * | 9/2007 | Griffith et al. .......... | 359/845 |
| 7,374,302 | B2 * | 5/2008 | Griffith et al. .......... | 359/849 |
| 2005/0254111 | A1 * | 11/2005 | Griffith et al. .......... | 359/224 |
| 2006/0103955 | A1 * | 5/2006 | Griffith et al. .......... | 359/843 |
| 2006/0103956 | A1 * | 5/2006 | Griffith et al. .......... | 359/845 |

FOREIGN PATENT DOCUMENTS

WO    WO 2007/077431 A1    7/2007

OTHER PUBLICATIONS

A. Yu et al.; "Compensation of Dynamic Thermal Deformation of Mirrors in High-Power Slab Lasers"; Quantum Electronics, 34(11) pp. 1040-1046; 2004.

T.C. Tseng; "Developement of an Aspherical Bimorph PZT Mirror Bender with Thin Film Resistor Electrode"; Advanced Photon Source, Argonne National Lab; pp. 271-278; 2002.

(Continued)

*Primary Examiner*—John R Lee
(74) *Attorney, Agent, or Firm*—MacPherson Kwok Chen & Heid LLP; Brent A. Folsom (57) ABSTRACT

A laser beam correction system and related methods of use and manufacture are provided. In one example, a laser beam correction system includes a mirror having a first surface and a second surface. An actuator comprising a piezoelectric ceramic disk and a plurality of conductive electrodes on substantially opposing sides of the disk is bonded to the second surface of the mirror. The actuator includes an aperture in a center portion. A wave-front sensor is adapted to measure optical wave-front characteristics of a laser beam received by the mirror and provide electronic signals corresponding to the wave-front characteristics.

30 Claims, 9 Drawing Sheets

OTHER PUBLICATIONS

Ehud Steinhaus et al.; "Bimorph Piezoelectric Flexible Mirror"; J. Opt. Soc. Am., vol. 69; pp. 478-481; 1979.
G. Rabczuk et al.; "Control of a High-Power CW CO2 Laser output Beam Properties By Using . . . "; The Szewalski Institute of Fluid Flow Machinery; Poland; no date.
A.V. Ikramov et al.; "Cooled Bimorph Adaptive Mirrors For Laser Optics"; Quantum Electronics, 24(7) pp. 613-617; 1994.
T. Yu et al.; "Doughnut-Like Laser Beam Output Formation By Intracavity Flexible Controlled Mirror"; Optics Express, vol. 3, pp. 188-189; 1998.
Andrey G. Safronov; "Bimorph Adaptive Optics: Elements, Technology and Design Principles"; 494/SPIE vol. 2774; 1996.
A. Abbas et al.; "Thermal Lens Correction in A Solid-State Laser Using a Flexible Bimorph Mirror"; Sov. J. Quantum Electron, 19(10); pp. 1338-1340; 1989.
S.A. Kokoroski; "Analysis of Adaptive Optical Elements Made From Piezoelectric Bimorphs"; J. Opt. Soc. AM., vol. 69; pp. 181-187; 1979.
P. Halevi; "Bimorph Piezoelectric Flexible Mirror: Graphical Solution and Comparison with Experiment"; Optical Society of America; pp. 110-113; 1983.
Sinha et al. Pub High Resolution Wavefront Control: Methods,Devices and Applications III, SPIE, vol. 4493 (2002) (pp. 55-63).
A. Kudryashov et al. "Adaptive Optics for High-Power Laser Beam Control", ISSN: 0930-8989, vol. 102 (2005) (pp. 237-248).
B.S. Vinevich,"Cooled and Uncoooled Single-Channel Deformable Mirrors for Industrial Laser Systems", Quantum Electronics 28, (1998) (pp. 366-369).
J. Schwarz et al. "Development of a Variable FocalLength Concave mirror for On-Shot Thermal lens Correction in Rod Amplifiers", Optics Express, vol. 14, No. 23 (2006) (pp. 13).
Commercial Product: "Variable Radius Mirror", Company II-VI, Inc., Web Link: http://www.livinfrared.com/products/mirrors.html#anchor_vrm (pp. 6).
Ken'ichi, "Adaptive Optics for High Power Lasers", Review of Laser Engineering, Vo. 27, No. 2 (1998)(pp. 84-88).

* cited by examiner

HIGH POWER BIMORPH WAVE-FRONT CORRECTION MIRROR

TECHNICAL FIELD

The present disclosure relates generally to wave-front correction for combined operation of multiple laser gain elements, in particular multiple solid state lasers.

BACKGROUND

All high power solid-state lasers experience some distortion of the laser beam due to temperature and stress-induced changes in the refractive index of the lasing material. In the case of cylindrical geometry lasers, the non-uniform temperature distribution is radially parabolic, resulting in a thermal lensing of the beam. Although a fixed focal length spherical optic can correct this aberration at one operating point, the degree of thermal lensing generally varies in proportion to the level of optical pumping, or heat dissipated. Therefore, a variable powered optic is sometimes necessary to avoid mode instabilities which can result in poor mode/gain overlap and intra-resonator focusing of the beam which can damage optics.

In long, thin solid-state gain elements, like rods, temperature dependent refractive index is the primary aberrating mechanism. However, in very thin gain elements, like disks, thermal bending of the lasing medium due to stress buildup is predominant—yet is still largely a parabolic wave-front distortion in nature. This effect is compounded when multiple rods or disks are used serially in the resonator. A variable power optical element is therefore used for high power solid-state lasers and amplifiers to correct thermal focus aberrations. Commercial-off-the-shelf (COTS) devices are not available to provide this correction.

Traditional adaptive optics may use a large area to achieve amplitude correction. This may involve the incorporation of beam expanders and telescopes into the beam train, which can greatly complicate problems and increase costs. Conventional bimorph mirrors may not operate with high wave-front quality at the flux levels required. Other approaches to wave-front correction and high power beams may employ active cooling or other heat removal methods, which can also add complexity and increase costs.

As a result, there is a need for focus correction of solid state lasers under varying thermal and power operating conditions.

SUMMARY

Systems and methods are disclosed herein to provide a bimorph deformable mirror for the focus correction of high power laser beams.

In accordance with an embodiment, a laser beam correction system includes a mirror having a first surface and a second surface. An actuator includes a piezoelectric ceramic disk and a plurality of conductive electrodes on substantially opposing sides of the disk. The actuator is bonded to the second surface of the mirror, the actuator having an aperture substantially in a center portion of the disk. The laser beam correction system includes a wave-front sensor adapted to measure optical wave-front characteristics of a laser beam received by the mirror and provide electronic signals corresponding to the wave-front characteristics.

In accordance with another embodiment, a method of manufacturing a high power bimorph wave-front correction mirror includes providing a mirror having a first surface and a second surface, wherein the first and second surfaces exhibit wave-front uniformity better than a selected wave-front criteria for light at a selected wavelength. A poled annular piezoelectric ceramic disk is formed, wherein the disk has a first side and a second side, an aperture substantially in a center portion of the disk, one or more pairs of electrodes on substantially opposing sides of the disk, and an outer lateral dimension greater than an outer lateral dimension of the mirror. The disk is subjected to stress cycling by applying a periodic bipolar voltage to the electrode pairs. The second surface of the mirror is bonded to the first side of the disk with adhesive to achieve a substantially zero stress bond to maintain the wave-front quality of the mirror after assembly of the mirror/disk combination. Wires are connected to substantially opposing conductive electrode pairs on the disk adapted to apply a voltage to enable piezoelectrically induced strain to deform the bonded mirror by a selected amount. The second side of the disk is mounted to a mounting base using a plurality of stand-offs adapted to adhere the disk to the mounting base.

In accordance with another embodiment, a method of correcting a wave-front of a laser beam includes receiving sensor information at a control filter, wherein the sensor information corresponds to a wave-front pattern of a laser beam of a laser. The received sensor information is compared to a desired wave-front pattern corresponding to a beam of selected wave-front characteristics. Voltage signals are generated in response to comparing the received sensor information to the desired wave-front pattern. The voltage signals are applied to a plurality of conductive electrodes on substantially opposing sides of a piezoelectric ceramic disk. A mirror bonded to the disk is deformed in response to the voltage signals until the received sensor information corresponds to the desired wave-front pattern.

The scope of the disclosure is defined by claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 13 A-C show various solid state laser systems with variable focus bimorph mirrors in accordance with the various embodiments of the disclosure.

Embodiments and their advantages are best understood by referring to the detailed description that follows. It should be appreciated that like reference numerals are used to identify like elements illustrated in one or more of the figures.

DETAILED DESCRIPTION

Figure 1A:
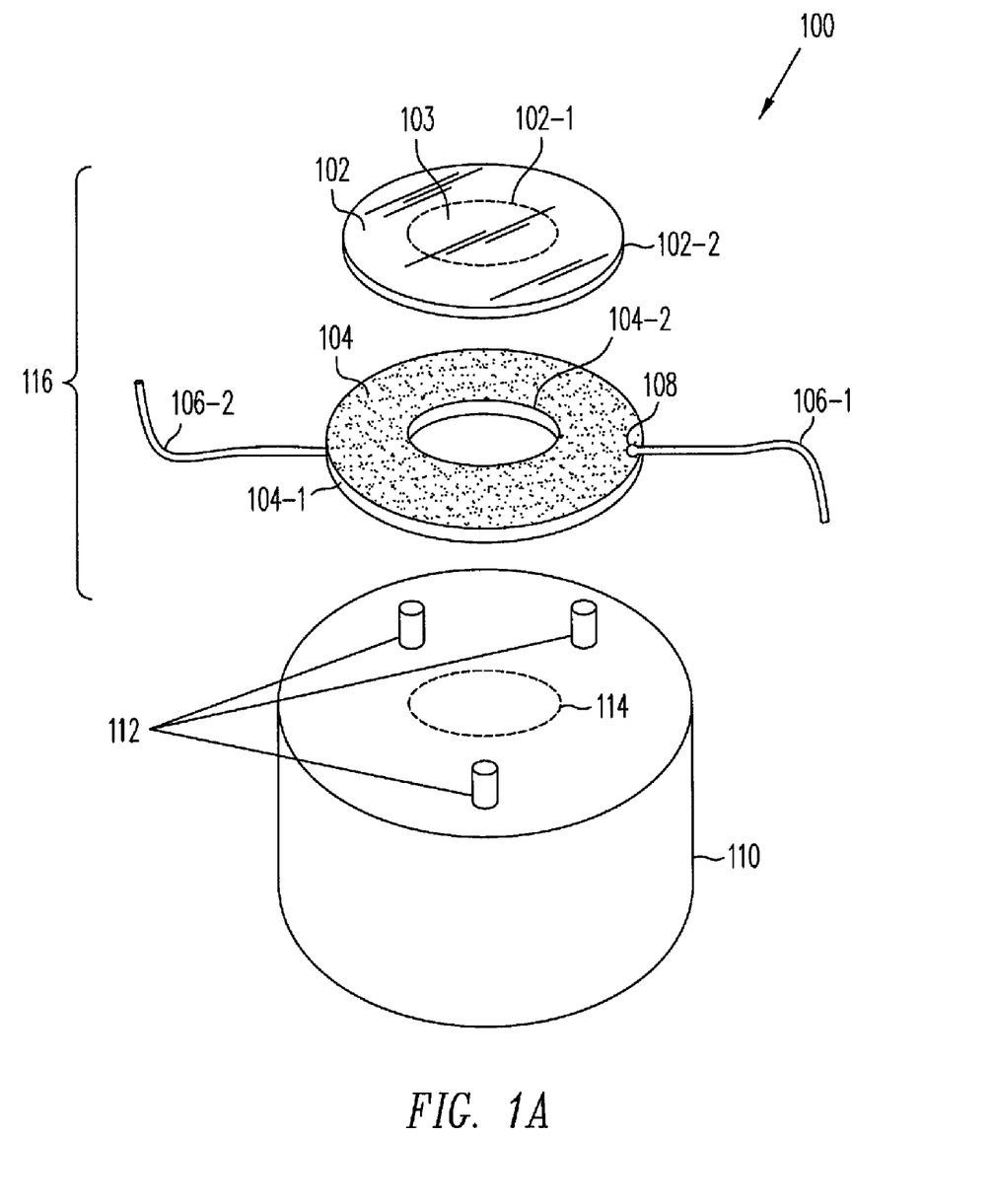
FIG. 1A shows an exploded view of a bimorph mirror assembly in accordance with an embodiment of the disclosure.
Figure 1B:
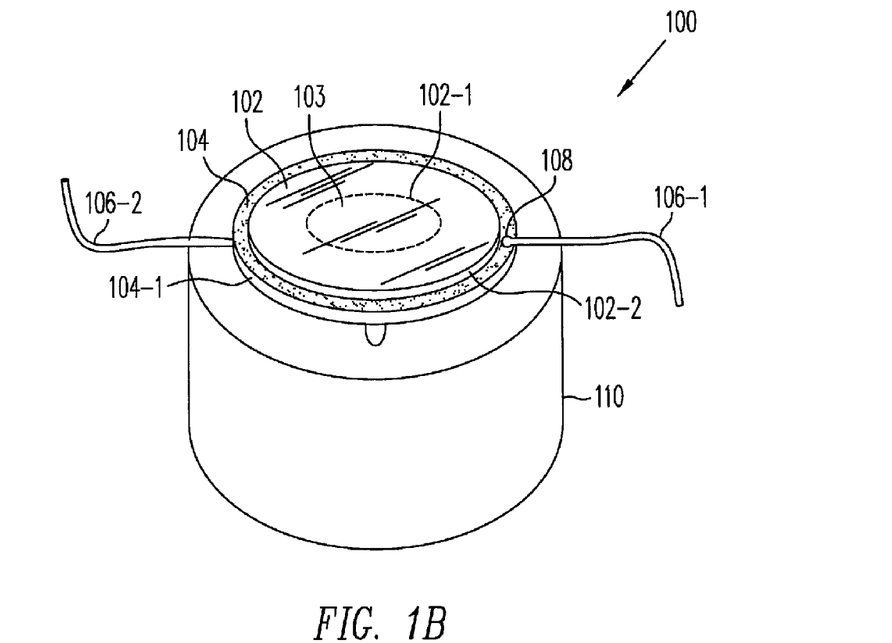
FIG. 1B shows an assembled view of the bimorph mirror assembly of FIG. 1A.

FIG. 1A is an exploded view of a bimorph mirror assembly 100 in accordance with an embodiment of the disclosure. FIG. 1B is an assembled view of the bimorph mirror assembly 100 of FIG. 1A.

Figure 1C:
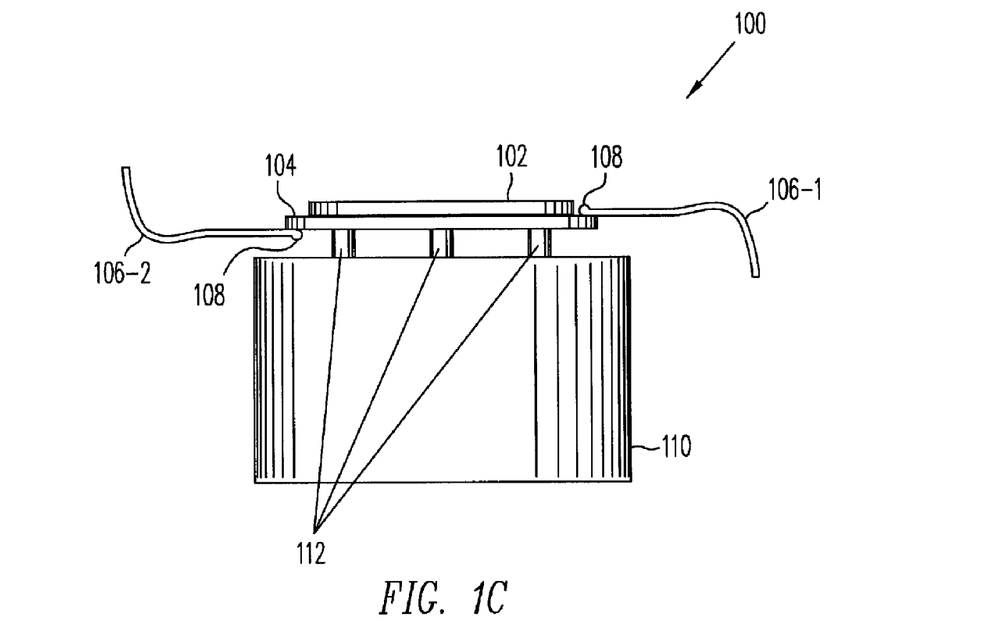
FIG. 1C shows a side view of the bimorph mirror assembly of FIG. 1B.

FIG. 1C is a side view of the bimorph mirror assembly 100 of FIGS. 1A and 1B.

Bimorph mirror assembly 100 includes a thin mirror 102 bonded to an annular thin piezoelectric ceramic disk actuator 104. The bond formed to attach mirror 102 to actuator 104 may be beneficially formed to achieve uniform thickness in order to minimize flatness or curvature distortion of mirror 102 under the action of actuator 104. Since a first side of mirror 102 may typically form one reflecting surface (e.g., a first surface) in the interior of a laser cavity, mirror 102 may be coated so the reflectivity of the first surface (i.e., the surface not bonded to actuator 104) may have a reflectivity between approximately 4% (i.e., the reflectivity of many uncoated optical glasses) to approximately 100%. For many laser applications it is preferred that the reflectivity of the first surface be approximately 99.99% or higher. A second side of mirror 102 may or may not serve as an output coupling mirror. Therefore the reflectivity of the second side (e.g., a second surface) may be between approximately 4% and approximately 0%, where lower reflectivity may improve the quality of the output coupled beam.

Either or both sides of mirror 102, and preferably the first surface may be ground and polished to a surface flatness of less than approximately $1/40^{th}$ of a wave root-mean-square deviation in wave-front quality at the wavelength of operation. Maintaining this degree of flatness throughout the coating and assembly processes is preferable if higher order aberrations are to be avoided during fabrication. Standard wave-front testing may be performed using standard metrology wave-front interferometers, such as may be obtained from 4D Technology Corporation or Zygo Corporation. In one embodiment, the first and second surfaces of mirror 102 may exhibit wave-front uniformity better than a selected wave-front criteria for light at a selected wavelength, as may be desired.

Bimorph mirror assembly 100 is mounted to a base mount 110 using a plurality of flexible posts 112 (also referred to as stand-offs) having low stiffness. A central portion 103 of mirror 102 having a diameter 102-1 is identified in which a central portion of a laser beam may partially transmit through mirror 102. The diameter 102-1 of central portion 103 is generally determined by inner diameter 104-2 of actuator 104. The transmitted optical power of the laser beam may be absorbed by base mount 110. Base mount 110 may be comprised of a material selected for a combination of properties, including heat capacity, thermal conductivity, and thermal coefficient of expansion. For example, in one embodiment, base mount 110 may be comprised of invar.

Flexible posts 112 provide attachment of a bonded mirror-actuator subassembly 116 in a manner that substantially eliminates the transmission of stress between actuator 104 and base 110. Flexible posts 112 may be made of a low outgassing material such as silicone rubber adhesive sealant (e.g., RTV™), molded in place to facilitate mounting of the mirror-actuator subassembly. Flexible posts 112 may provide mechanical isolation from base 110 so that differences in thermal expansion do not transmit distorting stress to subassembly 116 resulting from heat absorbed in base 110 from transmitted laser power.

An outer diameter 104-1 of actuator 104 may be chosen to be larger than a mirror outer diameter 102-2, so that electrical connections to actuator 104 may be made. A pair of electrode wires 106-1 and 106-2 may be attached to actuator 104 at locations 108. Wire 106-1 may be attached to the surface of actuator 104 to which mirror 102 is bonded, and wire 106-2 may be attached to the side of actuator 104 that faces mounting base 110. Attachment may be achieved with various bonding methods, including soldering. Attachment of wires 106 may be performed at locations 108 on actuator 104 and in a manner to minimize distortion of subassembly 116 in order to produce a change in the curvature of mirror 104 that is radially symmetric.

Prior to assembly and use, actuator 104, as fabricated, may have hysteresis, i.e., when a periodic voltage is applied there is a phase lag between the applied voltage and the elastic deformation of piezoelectric actuator 104. Additionally, this is manifest in a non-return to the same initial dimension (i.e., zero strain) when the voltage is removed. The process of manufacturing actuator 104 may include a hot pressing and sintering of ceramic powder, followed by poling at elevated temperatures. This may induce internal stresses that are responsible for the hysteresis. A process of "training," whereby actuator 104 is periodically stressed to a maximum strain value by application of a periodic bipolar voltage of a selected maximum amplitude and number of cycles may relax internal stresses by relieving internal dislocations. In an embodiment, actuator 104 comprises a polycrystalline material with considerable inter-atomic dislocation stress at the grain boundaries.

Figure 3:
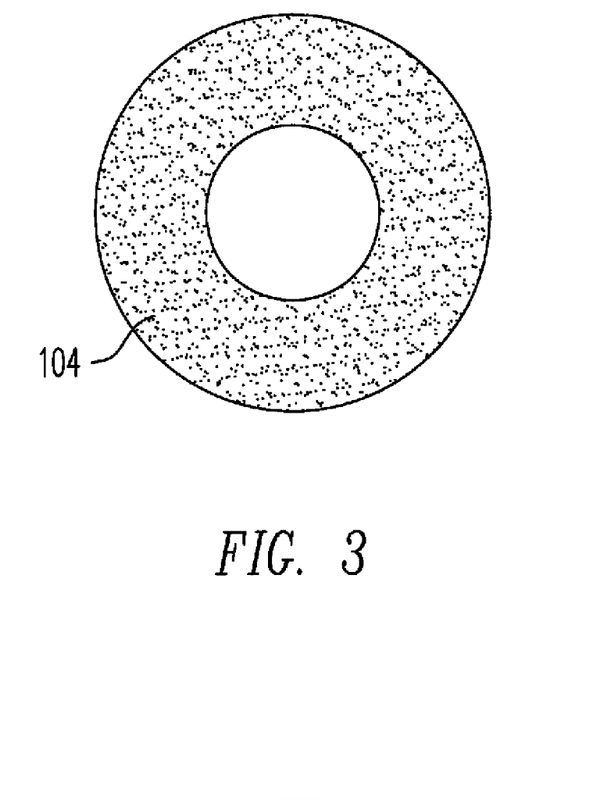
FIG. 3 shows an annular piezo-ceramic actuator in accordance with an embodiment of the disclosure.
Figure 4:
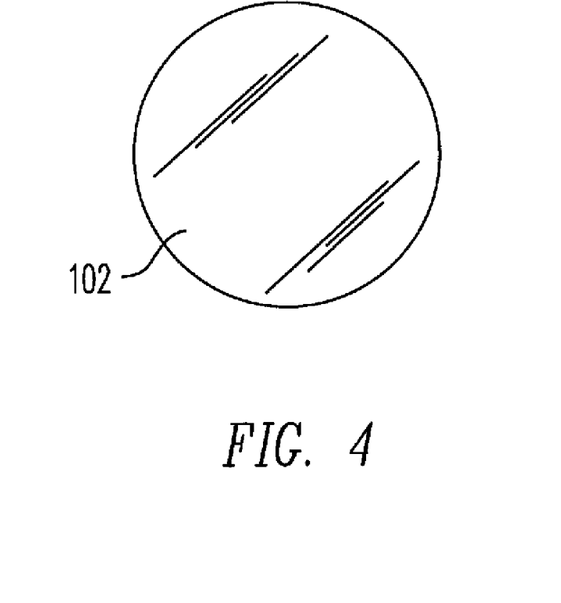
FIG. 4 shows a thin optical mirror in accordance with an embodiment of the disclosure.

Subassembly 116 includes actuator 104 bonded to mirror 102, which, in one embodiment, comprises standard grade fused silica (e.g., Corning 7980). The actuator is shown in FIG. 3 and the mirror is shown (separately) in FIG. 4. In one embodiment, the dimension of actuator 104 is 1.375" OD×0.591" ID×0.010" THK, and the dimension of mirror 102 is 1.000"Ø×0.028" THK. In this regard, it will be appreciated that an outer lateral dimension of actuator 104 (1.375" in this example) may be greater than an outer lateral dimension of mirror 102 (1.000" in this example) to provide space to attach electrical wire leads and maintain uniform strain on mirror 102. It is contemplated that different dimensions may be used in other embodiments.

Figure 2:
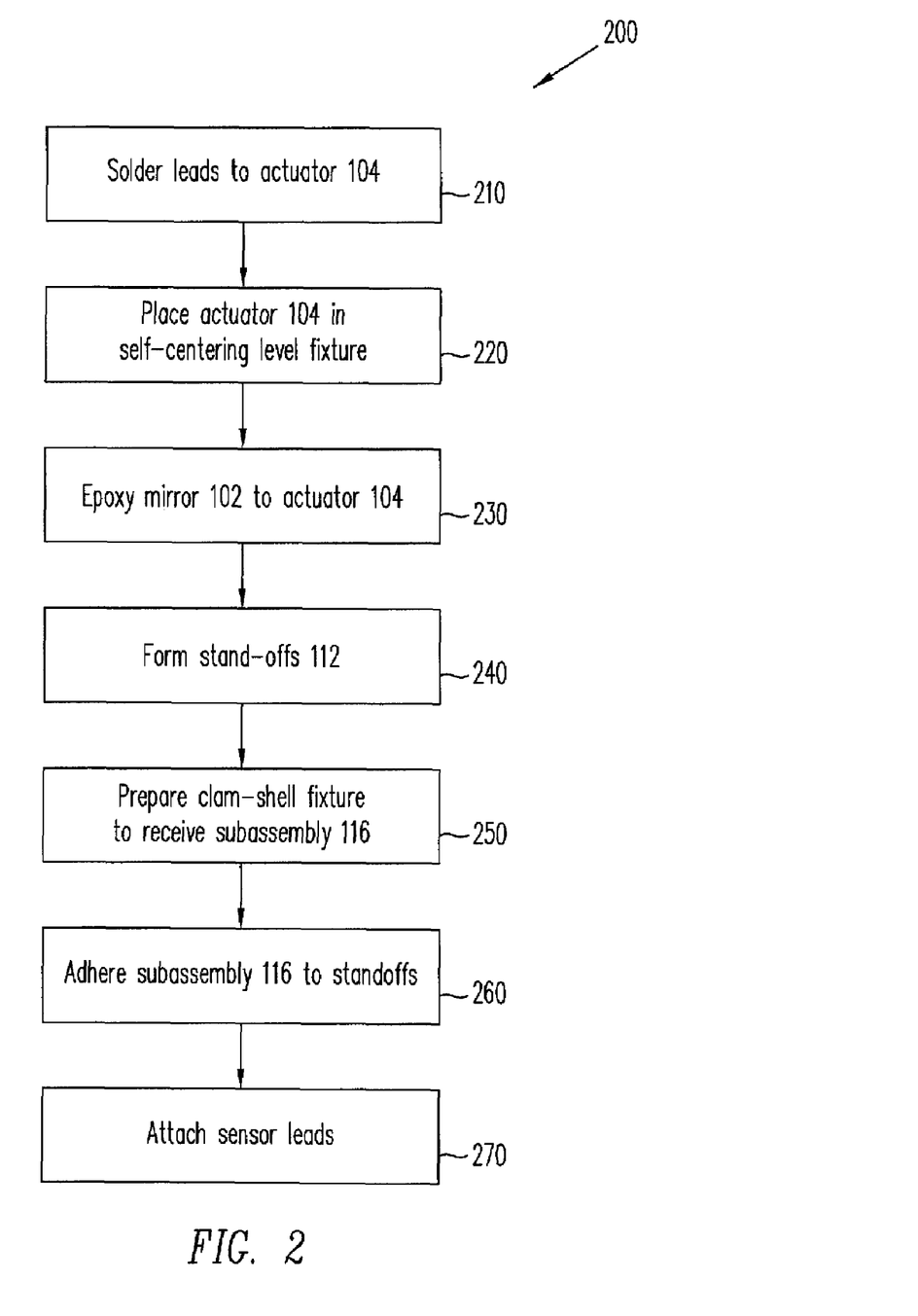
FIG. 2 shows a method of assembling a bimorph mirror assembly in accordance with an embodiment of the disclosure.

FIG. 2 shows a method of assembling a bimorph mirror assembly 100 in accordance with an embodiment of the disclosure. The first assembly procedure includes soldering control leads to actuator 104 (block 210) using standard soldering techniques. Thin, highly compliant wires are preferred to avoid induced bending moments on actuator 104. A liquid solder flux may preferably be used.

The next set of assembly procedures may preferably be performed on a laminar flow-bench in a clean room, and standard glove and facial coverings may also preferably be used. In one embodiment, actuator 104, the surfaces of mirror 102 (front and back) may be thoroughly cleaned and all residue (including solder flux) and particulates removed. Standard filtered compressed air to blow particulates, solvents (e.g., acetone, methanol, and isopropanol) and lint-free cloths to clean surfaces may be used in this regard. Actuator 104 may first be cleaned with acetone and lint-free cloth, followed by a second wiping with methanol and finally a wiping with isopropanol. The front surface of mirror 102 may be placed face down on a lint-free cloth and a standard drag wipe with isopropanol and a laboratory grade lens tissue may be applied to clean the back side, which will be bonded to actuator 104.

Figure 5:
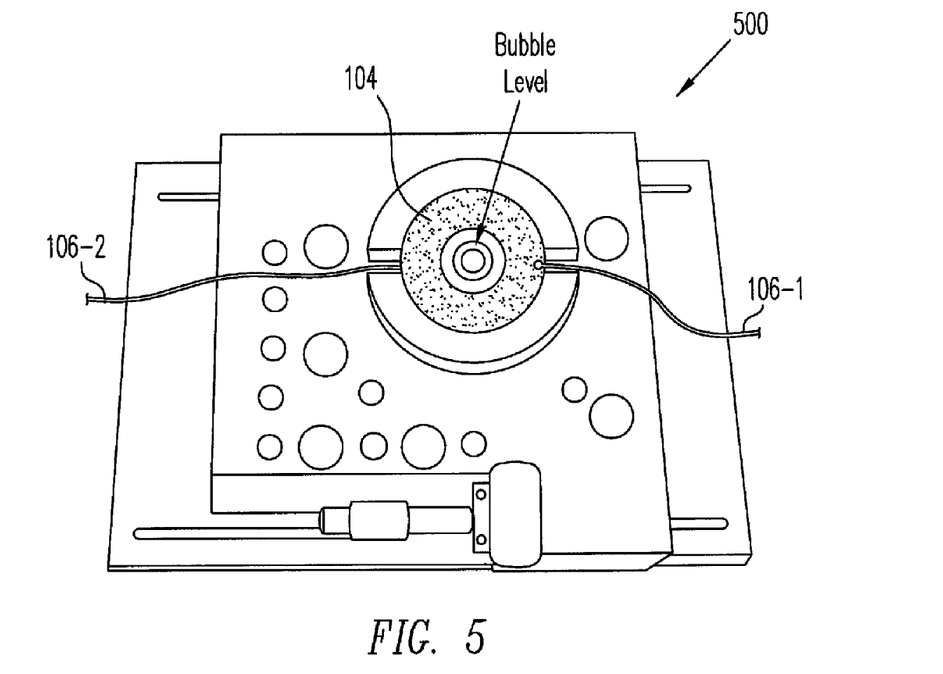
FIG. 5 shows a piezo actuator in a self-centering level fixture in accordance with an embodiment of the disclosure.
Figure 6:
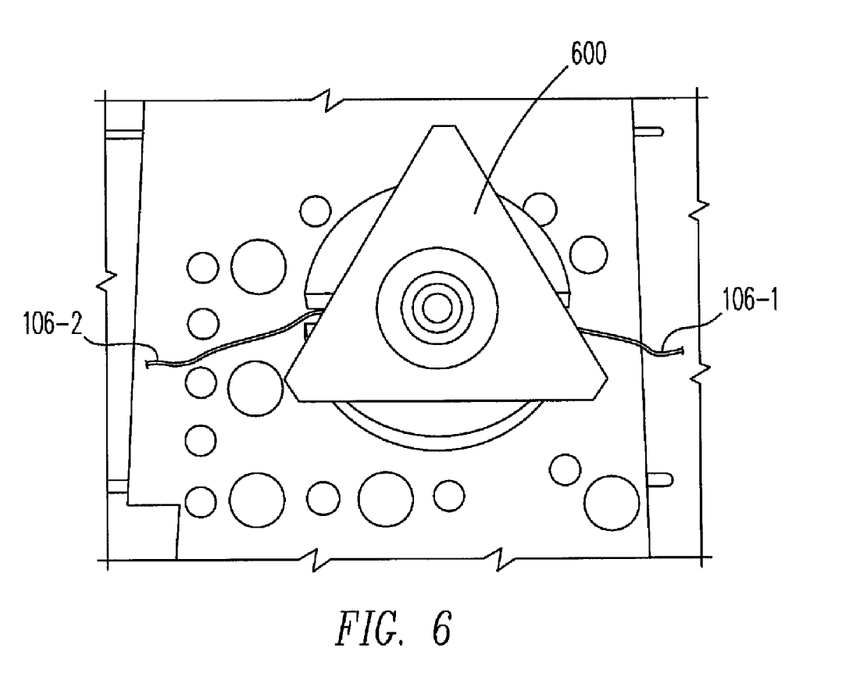
FIG. 6 shows an adhesive locating fixture on a self-centering assembly fixture in accordance with an embodiment of the disclosure.

A self-centering level assembly fixture 500, as shown in FIG. 5, may be used for the next assembly procedure. Using various steps as described above, fixture 500 may be pre-cleaned with compressed air and a wipe-down with isopropanol. A bubble level may be used to obtain proper leveling of fixture 500 and to avoid any runs when later applying liquid adhesive. Actuator 104 may then be placed into fixture 500 (block 220), as shown in FIG. 5. A self-centering adhesive locating fixture 600 may be pre-cleaned, as above, and may be placed over actuator 104, as shown in FIG. 6, and fastened in place, for example, with set screws (not shown). Locating holes (not shown) in fixture 600 should be thoroughly flushed with acetone and isopropanol, using a syringe and blunt-tip hypodermic needle prior to use.

In block 230, mirror 102 is bonded to actuator 104. In one embodiment, a self-centering vacuum chuck (not shown) to hold mirror 102 may be used in block 230. The chuck may be pre-cleaned with acetone and isopropanol wipe-downs in preparation for bonding mirror 102 to actuator 104.

A mixture of a two part ultra-low viscosity surface epoxy adhesive may preferably be used in the bonding process. An epoxy with a room-temperature cure time in excess of 3 hours may be preferred, as a faster cure time may generally induce higher localized heating and exhibit greater shrinkage, both of which may distort mirror 102 during the cure step.

In one exemplary embodiment, West Systems brand #105 resin with #209 extra-slow hardener, having a 3.5:1 mixture ratio, may be used for the bonding. It is preferred that weight measurements be as precise as feasible to avoid applying either too much or too little adhesive to the bond surface. Weights indicated below are exemplary, and have been found to be acceptable for the dimensions pertaining to subassembly 116 described above. For example, using a precision scale, 1.556 grams of West Systems #105 epoxy resin may be measured into an appropriate mixing container. The container may preferably be clean and comprised of a material with low particulate generation, impervious to the epoxy chemicals. One example of a container is a disposable aluminum mixing dish. 0.444 grams of West Systems #209 epoxy hardener may be weighed out and added to the resin, for a total mass of 2.000 g. 0.050 grams of 5 Mm diameter silica micro-sphere filler material (precision glass beads) may then be added to ensure a uniform bond-line thickness of 5 μm. In other embodiments the bond-line thickness may range from approximately 10 nanometers and approximately 0.1 millimeter. It should be appreciated that the uniformity of the thickness is a factor in maintaining the wave-front properties of mirror 102.

The components may be thoroughly mixed for 5 minutes, with a gentle mixing motion to ensure a minimal amount of entrapped air, and to maintain the glass beads in uniform suspension. Other commercially available epoxies may be used having various weights as may be desired depending on ambient conditions such as, for example, temperature, humidity, or atmospheric pressure, and by the details of the manufacturer's formulation. Preferably, the glass beads may maintain a substantially high uniformity of thickness of the adhesive bond-line provided the suspension is uniformly mixed when dispensed, and care should be taken to minimize entrapped air. Variations in quantities may occur for varying assembly conditions and applications (such as for example, a larger or smaller subassembly 116, or different selection of bead size).

A syringe, with the orifice cap left on and the plunger removed, may be filled with the wet epoxy mixture. The plunger tip may be replaced, and the syringe inverted so that the mixture runs toward the plunger. The orifice cap may then be removed and a ½ inch −25 gage needle installed, and the air may then be expelled from the syringe by carefully forcing the plunger upward. The needle may be placed into each locating hole (not shown) of fixture 600 to apply exactly one drop of adhesive at each location as may typically be dispensed from a 25 gage needle. It will be appreciated that variations in the dimensions of various structures may result in more or less epoxy mixture being dispensed. In one embodiment, the viscosity of the epoxy may preferably be in the range from approximately 725 centipoise to approximately 1000 centipoise. It is contemplated that different viscosity ranges may be used in various embodiments depending on the sizes of glass beads or the dimensions of mirror 102 and actuator 104. In one embodiment, set screws (not shown) may then be loosened and the adhesive locating fixture 600 removed from assembly fixture 500.

Mirror 102 may be placed on the above-identified vacuum chuck with the high reflectivity coated side face down, taking precaution to ensure that mirror 102 may be centered on the chuck. The vacuum to the chuck may be enabled to hold mirror 102. The chuck may be carefully inverted over a clean lint-free cloth to test for proper vacuum seal. The chuck may then be placed over the assembly fixture 500, and care may be taken to ensure that it is properly seated. The vacuum may then be disabled, and several seconds allowed for the vacuum to release sufficiently for mirror 102 to drop onto the adhesive prepped actuator 104.

The chuck may then be removed from fixture 500, and the fixture 500 may then be left undisturbed for a minimum of 24 hours. The resultant bond-line is preferably very thin, and its uniformity and dimension is determined substantially by the size of the glass beads. Uniformity of the bond-line is intended to avoid distortion of mirror 102 due to non-uniform shrinkage of the adhesive that may occur if the adhesive layer is too thick.

Fixture 500 may then be cleaned of adhesive residue using acetone and a 22 gage needle to flush the holes, followed by a similar flushing with isopropanol. The surfaces may be wiped with acetone, then isopropanol, using a clean soft lint-free cloth.

The completed subassembly 116 may be tested (for example, using standard wave-front testing as previously described herein) for wave front error after 24 hours of initial cure time. In one exemplary embodiment, it may be preferred that the flatness of mirror 102 (either the front or the back) be flat to approximately $\frac{1}{40}^{th}$ of a wave at the wavelength of the laser. Other applications may be implemented with more or less stringent wave-front flatness. Immediately after each test, subassembly 116 may be returned to assembly fixture 500 to ensure a flat, level mating surface for the remainder of the cure. In one embodiment, actuation voltage is not to be applied to actuator 104 for a minimum of 2 weeks, to ensure the adhesive is fully cured before introducing any bending stress.

Subassembly 116 may preferably be supported on base mount 110 with flexible posts 112 (i.e., stand-offs) to allow for proper alignment in an optical system. Additionally, flexible posts 112 may preferably be sufficiently compliant to allow for the bending deformation induced by the actuation voltage without significant mechanical coupling to base mount 110, which may be comprised of a stiff material. In one embodiment, flexible posts 112 may be comprised of a space-grade silicone rubber compound such as, for example, part number RTV™ 566, manufactured by GE Bayer Silicones, which may yield good results due to its low stiffness and low out-gassing characteristics under high heat load. Because mirror 102 may be used in a high-energy laser resonator, any energy that leaks through the mirror coating will be nearly entirely absorbed in base mount 110. In one embodiment, invar 36 may be used for base 110, due to its low coefficient of thermal expansion (CTE).

Figure 7:
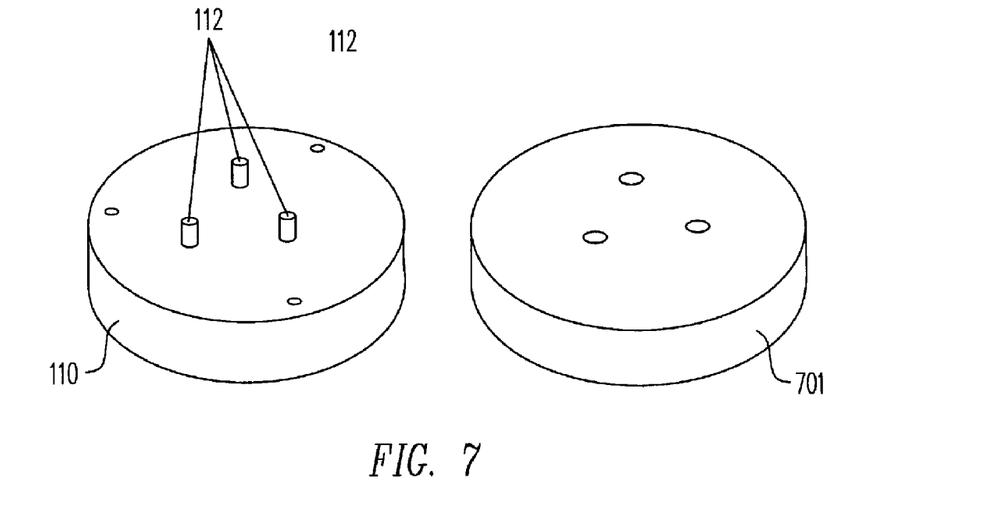
FIG. 7 shows a stand-off mold for forming stand-off mounts in accordance with an embodiment of the disclosure.

Referring to FIG. 7, a Teflon™ stand-off mold 701 may be placed over base mount 110 to form flexible posts 112 (block 240). An appropriate quantity of compliant, low out-gassing RTV™ compound may be mixed and injected into the mold 701 using, for example, a 14 gage stainless steel needle and syringe, and allowed to cure. After curing, a razor blade or knife may be used to cut away the spill-over material, so that each flexible post 112 is flat and flush with the top of mold 701. After curing, mold 701 may be lifted from the substrate without any twisting motion to avoid shearing the stand-offs.

Figure 8:
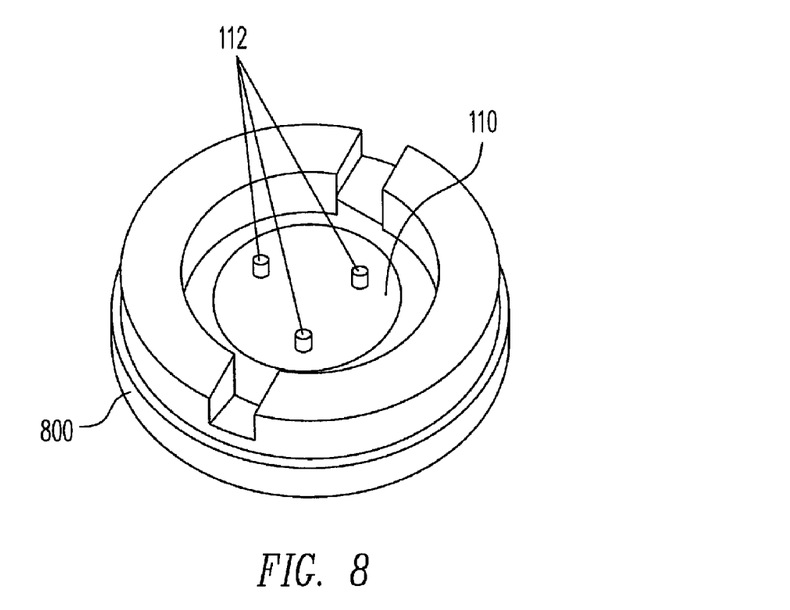
FIG. 8 shows a clam-shell centering fixture for locating a bimorph mirror assembly on stand-offs in accordance with an embodiment of the disclosure.
Figure 9:
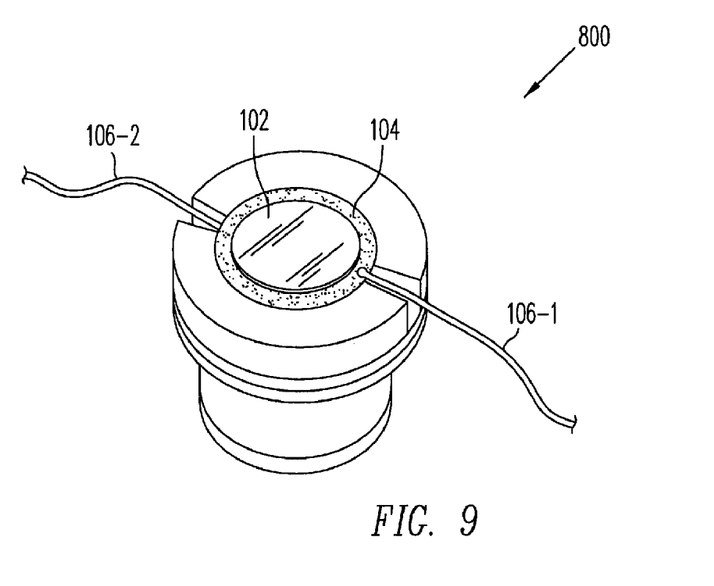
FIG. 9 shows a piezo actuator in a clam-shell centering fixture in accordance with an embodiment of the disclosure.

During block 260 of FIG. 2, clam-shell bimorph mirror alignment fixture 800 (see FIG. 8) may be placed over base mount 110 and secured with a rubber band. RTV™ compound may be mixed and dabbed onto the cured ends of each flexible post 112. Subassembly 116 may be placed in fixture 800 to adhere subassembly 116 to flexible posts 112 (block 260) as shown in FIG. 9. Mirror 102 may be covered with a piece of lens tissue folded several times to protect the surface. A small weight of approximately one to two ounces may be applied for several seconds to force subassembly 116 onto flexible posts 112, spreading the uncured RTV™ compound to adhere subassembly 116 to flexible posts 112. The weight may be removed and the bimorph mirror assembly 100 may be allowed to cure. Stand-off posts 112 may be fabricated from other flexible curable materials than RTV™, which is an exemplary material.

Figure 10:
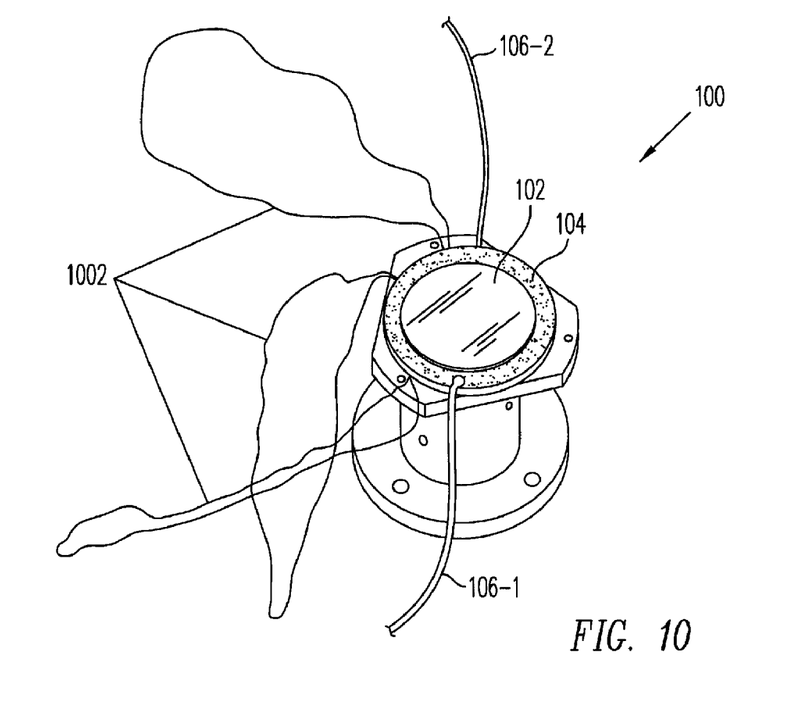
FIG. 10 shows a mounted bimorph mirror assembly, in accordance with an embodiment of the disclosure.

FIG. 10 shows a complete mounted bimorph mirror assembly 100, in accordance with an embodiment of the disclosure. Multiple sensor leads 1002 (e.g., implemented by multiple strands of 36 gage wire) may be attached (block 270) to, for example, four radially located strain gages (optional, not shown) attached to the back of the device. Wires 106-1 and 106-2 are also (previously) attached. After final assembly, the device may be packaged and wires 106-1, 106-2 and sensor leads 1002 may terminated appropriately for integration into an optical system.

Figure 11:
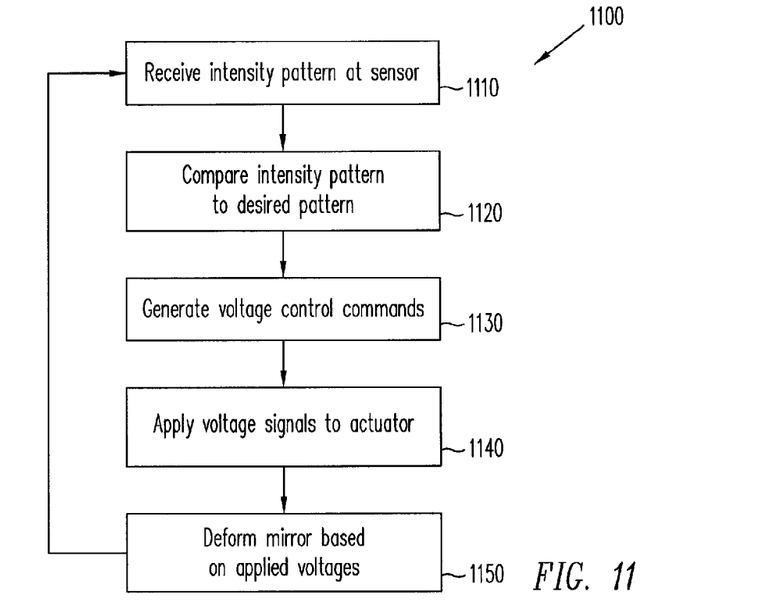
FIG. 11 shows a method of correcting a laser beam in accordance with an embodiment of the disclosure.

As an example, FIG. 11 illustrates a method 1100 of correcting a laser beam. A portion of the laser beam pattern is received by a beam pattern intensity sensor (block 1110). As an example, a beam splitter may be used to direct a small fraction of the beam to the sensor. The beam splitter may be external to the laser or, alternatively, it may be intra-cavity. The beam pattern and intensity may be segmented or digitized into pixels. Other known methods of beam sensing may be substituted accordingly.

The received intensity pattern is compared to a desired beam intensity pattern (block 1120). In block 1130, a controller may generate voltage commands to an amplifier based on the comparison of block 1120. For example, a differential mapping of the actual versus the desired beam pattern may be generated by the controller. The magnitude of the intensity differences in pixels of corresponding desired and actual pattern intensity distribution may be used to generate voltage vector value commands (i.e., polarity and amplitude).

The voltage commands (which may be, for example, in digital format) may be converted to amplified analog voltages by a digital-to-analog amplifier, which are then applied to the wires 106 attached to actuator 104 (block 1140). The applied voltages may cause actuator 104 to deform mirror 102 to correct the beam pattern (block 1150). Strain gages may be attached to actuator 104 to measure strain, a beam pattern sensor may characterize the beam, and the two sets of sensor signals may be correlated to control the actuator for desired beam characteristics. The process may be iterative, so that the method may continue by returning to block 1110 for continuously receiving beam intensity patterns for beam correction until, for example, a received beam intensity pattern substantially corresponds to the desired beam pattern.

Figure 12:
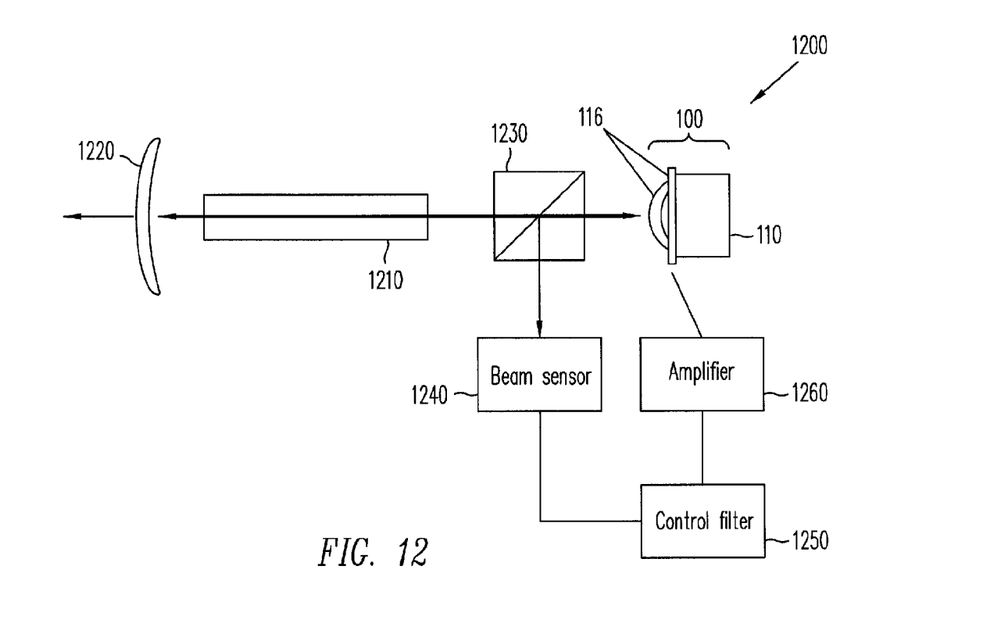
FIG. 12 shows a laser system with a bimorph mirror assembly in accordance with an embodiment of the disclosure.

An implementation of assembly 100 in a laser system 1200 is shown in FIG. 12. A laser 1210 may contain one or more solid state laser rods or slabs of lasing material, which may be excited by, for example, optical pumping (not shown) of light of suitable intensity and wavelength. A resonant cavity is formed by containing the laser 1210 between two high reflectance mirrors, one of which may be output mirror 1220, and the other may be mirror 102 of bimorph mirror assembly 100. In the case of cylindrical rod laser material, temperature and stress-induced changes in the refractive index of the lasing material may be radial in nature due to the rod symmetry. The refractive index gradient induced radially may result in self-focusing types of effects, and alter the distribution of intensity and phase in the beam in a like manner. Altering the curvature of mirror 102 may compensate for this effect. By applying a voltage to actuator 104, a dimensional change may be produced in the radial direction of actuator 104. The bonded mirror 102, however, may constrain the surface stress condition on the bonded side of actuator 104, which is different from that of the opposite side of actuator 104. This may result in a change in the curvature of mirror 102. Depending on the applied voltage, the curvature of mirror 102 may be concave or convex. This change may enable a more uniform distribution of energy and laser excitation in the lasing material and beam aperture of laser 1210.

A fraction of the beam produced in the cavity of laser system 1200 may be split off by a prism cube 1230, or equivalent, and directed from the cavity of laser system 1200 to a beam characterization sensor 1240. Examples of beam characterization sensors include wave-front sensors and intensity pattern sensors. The beam distribution obtained may be used in a controller 1250 (also referred to as a control filter) to generate a one or more commands to a voltage generator 1260 (also referred to as an amplifier, or voltage amplifier) to apply a corrective voltage to the one or more segments of actuator 104 to adjust the beam distribution detected in sensor 1240. Beam characterization sensor 1240 may generate sensor information in digital or analog form. Controller 1250 may generate commands in analog or digital form. If sensor 1240 and controller 1250 output have a digital form, for example, voltage generator 1260 may perform a digital-to-analog (D/A) conversion to provide an amplified analog voltage to segments of actuator 104. For the exemplary dimensions of subassembly 116 as described above, implementation in an appropriately dimensioned laser cavity may have an actuation response bandwidth from 0 Hz to approximately 1000 Hz.

This bandwidth may have a higher or lower upper limit, depending on the mechanical properties of subassembly 116 and the stability properties of the laser. A specific laser design, mechanical dimensions, and materials stiffness (e.g., for actuator 104 and mirror 102) may determine the operational parameters for speed of response of sensor 1240, controller 1250, and generator 160.

In another embodiment in accordance with the disclosure, actuator 104 may have segmented electrodes to selectively apply voltages of different values circumferentially about actuator 104. This may employ a larger number of electrodes, and the applied voltages may be bipolar, so that some portions of subassembly 116 act to change the curvature of mirror 102 in a convex manner in some locations and concave in others. In this manner, it may enable subassembly 116 to correct higher order beam distortions. Strain gages (not shown) may be attached to subassembly, preferably on the rear surface of actuator 104, to measure strain to correlate with signals at least from generator 1260 and sensor 1240.

Figure 13A:
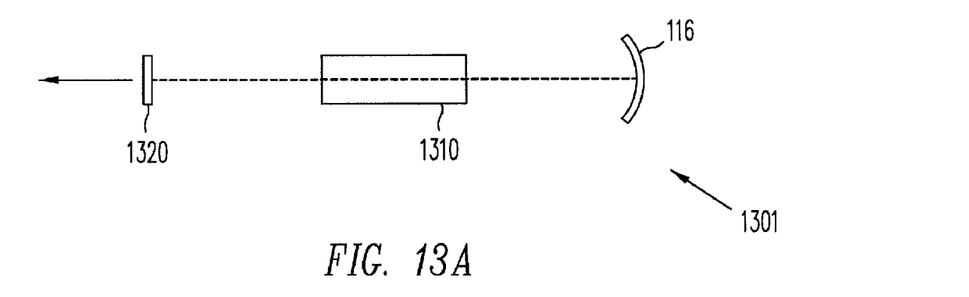
Figure 13B:
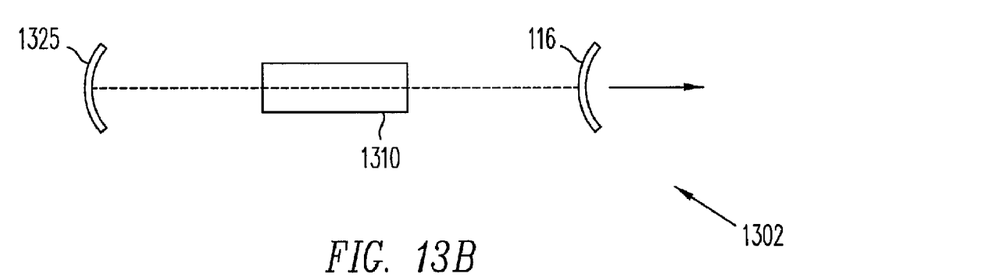
Figure 13C:
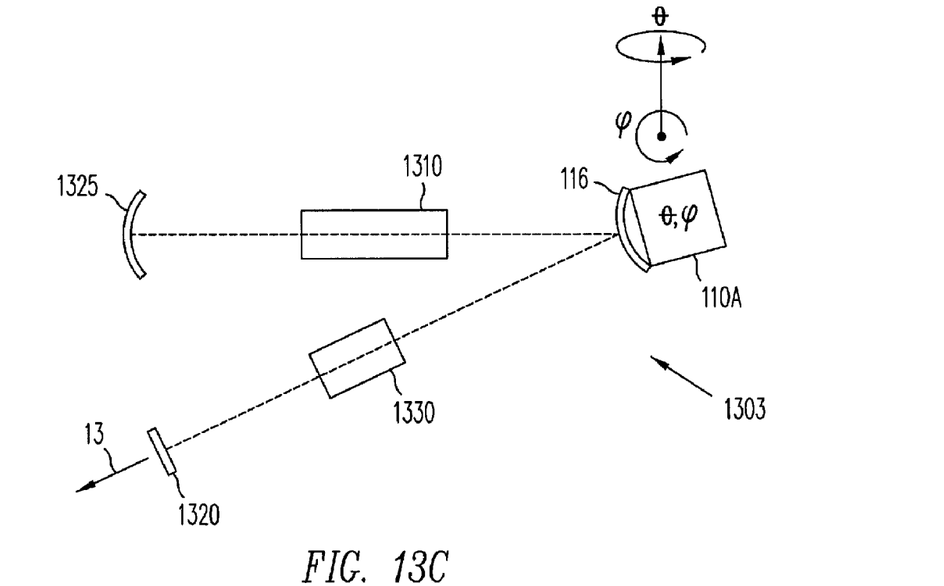

FIGS. 13 A-C illustrates various embodiments of a solid state laser system with a variable focus bimorph mirror in accordance with the disclosure.

Referring to FIG. 13A, a laser cavity 1301 includes an output mirror 1320, a solid state laser gain medium comprised of one or more solid state laser rods 1310, and mirror-actuator subassembly 116. In this embodiment, mirror 102 of subassembly 116 may be a primary high reflecting mirror in a stable or unstable resonator configuration. The associated control system of FIG. 12, comprising beam splitter 1230, sensor 1240, controller 1250 and voltage generator 1160 are not shown, but may be implemented by way of reference to FIG. 12.

Referring to FIG. 13B, mirror 102 of subassembly 116 may be partially transmitting and serve as an output mirror in a stable or unstable resonator. In this case, base mount 110 (not shown), on which subassembly 116 is mounted, may additionally be provided with an annulus through hole (not shown) to accommodate the output beam. A mirror 1325 may serve as a high reflectivity mirror forming one end of the resonator cavity. As in FIG. 13A, the associated control system is not shown, but may be implemented by way of reference to FIG. 12.

Referring to FIG. 13C, mirror 102 of subassembly 116 may be used as a high reflectance folding mirror in a stable or unstable resonator cavity that includes a nonlinear optical element 1330. A mirror 1325 may serve as a high reflectivity mirror forming one end of the resonator cavity, and mirror 1320 may form the other cavity mirror, having partial transmission to serve as an output for the laser beam. Nonlinear optical element 1330 may provide one or more nonlinear optical functions, such as, for example, frequency doubling, Raman shifting, or frequency mixing. In this case the reflectivity of all mirrors in FIG. 13C, including mirror 102, may take into account reflectivity at more than one frequency.

In this embodiment, since a portion of the beam incident on mirror 102 may be transmitted through to base mount 110 at a non-normal angle of incidence, laser energy may be absorbed by this structure in a non-symmetric manner. This may result in a non-uniform heating of base mount 110, which in turn may cause a non symmetric heating of flexible posts 112. Thus, the thermal load may be different for each flexible post 112. Since materials such as may be used for flexible posts 112 may typically have higher coefficients of thermal expansion (CTE) than the base mount 110 material (e.g., invar), thermally induced pointing error of mirror 102 may result, which may be measured and corrected.

In this case, a base mount 110A may incorporate a motor actuated tip-tilt stage capable of goniometric rotation θ, φ about two perpendicular axes. Correction pointing may be implemented, for example, by monitoring the beam with beam sensor 1240 (FIG. 12) or an equivalent, and a correction filter (e.g., which may be incorporated in control filter 1250 or separately) may generate feedback control commands to drive the tip-tilt axes of base mount 110A to correct pointing error. A diagnostic laser beam, such as provided by a diode laser (not shown) may be injected into the laser cavity (e.g., through prism 1230 of FIG. 12, or an equivalent prism placed appropriately) and the diagnostic beam reflected from mirror 102 may be monitored in a manner similar or equivalent to that described above pertaining to beam characterization.

Embodiments described above illustrate but do not limit the disclosure. It should also be understood that numerous modifications and variations are possible in accordance with the principles of the present disclosure. Accordingly, the scope of the disclosure is defined only by the following claims.

We claim:

1. A laser beam correction system comprising:
   a mirror having a first surface and a second surface;
   an actuator comprising a piezoelectric ceramic disk and a plurality of conductive electrodes on substantially opposing sides of the disk, wherein the actuator is bonded to the second surface of the mirror, and wherein the actuator comprises an aperture substantially in a center portion of the disk; and
   a wave-front sensor adapted to measure optical wave-front characteristics of a laser beam received by the mirror and provide electronic signals corresponding to the wave-front characteristics.

2. The system of claim 1, further comprising a control filter adapted to convert the electronic signals to actuator commands.

3. The system of claim 2, further comprising an amplifier adapted to convert the commands to voltages to be applied to the electrodes of the actuator to correct the optical wave-front of the laser beam.

4. The system of claim 3, wherein the amplifier is adapted to accept analog and/or digital commands from the control filter and output analog voltages to the actuator.

5. The system of claim 3, wherein the actuator, the control filter, and the amplifier have an actuation response bandwidth of 0 Hz to approximately 1000 Hz.

6. The system of claim 1, wherein the actuator comprises a plurality of segments adapted to control focus and higher order optical aberrations, wherein each segment comprises a pair of electrodes on substantially opposing sides of the actuator.

7. The system of claim 1 further comprising a base mount facing the actuator and the second surface of the mirror, wherein the mounting base supports the mirror and actuator.

8. The system of claim 7, further comprising:
   wherein the base mount comprises a motor actuated tip-tilt stage adapted to support the mirror and the actuator;
   a pointing sensor adapted to measure alignment of a beam reflected from the first surface of the mirror and provide electronic signals corresponding to the error of the measured pointing directions of the mirror; and
   a correction filter adapted to receive the electronic signals corresponding to the pointing direction errors and generate actuator commands to the tip-tilt stage to correct the orientation of the mirror.

9. The system of claim 8, wherein the alignment beam is provided by a diagnostic beam introduced into the laser cavity.

10. The system of claim 8, wherein the pointing sensor is implemented by the optical wave-front sensor.

11. The system of claim 8, further comprising a beam splitter adapted to direct a portion of the laser beam to the pointing sensor.

12. The system of claim 1, further comprising a one or more strain gauges.

13. The system of claim 1, wherein the mirror and actuator comprise a bimorph correction mirror assembly, the assembly is adapted to correct a thermally induced wave-front error of the laser beam.

14. The system of claim 1, wherein the first surface is coated with a first reflectivity coating and the second surface is coated with a second reflectivity coating at one or more selected wavelengths.

15. The system of claim 14, wherein the first reflectivity coating has a reflectivity between approximately 4% and approximately 100%.

16. The system of claim 14, wherein the second reflectivity coating has a reflectivity less than approximately 4%.

17. The system of claim 1, further comprising a beam splitter adapted to direct a portion of the laser beam to the wave-front sensor.

18. A method of manufacturing a bimorph wave-front correction mirror, the method comprising:
   providing a mirror having a first surface and a second surface, wherein the first and second surfaces exhibit wave-front uniformity better than a selected wave-front criteria for light at a selected wavelength;
   forming a poled annular piezoelectric ceramic disk, wherein the disk has a first side and a second side, an aperture substantially in a center portion of the disk, one or more pairs of electrodes on substantially opposing sides of the disk, and an outer lateral dimension greater than an outer lateral dimension of the mirror;
   stress cycling the disk by applying a periodic bipolar voltage to the electrode pairs;
   bonding the second surface of the mirror to the first side of the disk with adhesive to achieve a substantially zero stress bond to maintain the wave-front quality of the mirror after assembly of the mirror/disk combination;
   connecting wires to substantially opposing conductive electrode pairs on the disk adapted to apply a voltage to enable piezoelectrically induced strain to deform the bonded mirror by a selected amount; and
   mounting the second side of the disk to a mounting base using a plurality of stand-offs adapted to adhere the disk to the mounting base.

19. The method of claim 18, wherein the mounting base comprises an aperture substantially in a center portion of the mounting base, wherein the aperture of the mounting base is greater than the aperture of the disk.

20. The method of claim 18, further comprising attaching one or more strain sensors to the disk.

21. The method of claim 18, wherein the providing comprises:
   polishing the mirror on both a first surface and a second surface to exhibit less than approximately $1/40^{th}$ of a wave root-mean-square deviation in wave-front surface quality at a specified wavelength;
   coating the first surface of the mirror with a first reflectivity coating to achieve a specified reflectivity at a first specified wavelength over at least a first specified portion of the mirror; and
   coating the second surface of the mirror with a second reflectivity coating to reduce reflection at a second specified wavelength below a second specified amount over at least a second specified portion of the mirror.

22. The method of claim 21, wherein the first reflectivity coating has a reflectivity between approximately 4% and approximately 100%.

23. The method of claim 21, wherein the second reflectivity coating has a reflectivity less than approximately 4%.

24. The method of claim 18, wherein the bonding comprises:
   statically leveling the disk;
   cleaning the first side of the disk and the second surface of the mirror;
   applying an epoxy to an interface between the mirror and the disk; and
   curing the epoxy in a statically undisturbed state at a controlled temperature.

25. The method of claim 24, wherein the epoxy has a viscosity between approximately 725 and approximately 1000 centipoise.

26. The method of claim 24, wherein the thickness of the epoxy layer is between approximately 10 nanometers and approximately 0.1 millimeter.

27. The method of claim 24, wherein the curing is performed for longer than 24 hours.

28. A method of correcting a wave-front of a laser beam, the method comprises:
   receiving sensor information at a control filter, wherein the sensor information corresponds to a wave-front pattern of a laser beam of a laser;
   comparing the received sensor information to a desired wave-front pattern corresponding to a beam of selected wave-front characteristics;
   generating voltage signals in response to the comparing;
   applying the voltage signals to a plurality of conductive electrodes on substantially opposing sides of a piezoelectric ceramic disk, said piezoelectric ceramic disk having an aperture substantially in a center portion of the disk; and
   deforming a mirror bonded to the disk in response to the voltage signals until the received sensor information corresponds to the desired wave-front pattern.

29. The method of claim 28, wherein the laser beam is internal to the laser.

30. The method of claim 28, wherein the laser is a solid state laser.

* * * * *